United States Patent [19]
Dade et al.

[11] Patent Number: 5,495,157
[45] Date of Patent: Feb. 27, 1996

[54] CABLE REELING SYSTEM

[75] Inventors: Malcolm J. Dade, Leicestershire; Marcus Richards, Nottingham, both of England

[73] Assignee: Metool Products Limited, England

[21] Appl. No.: 185,956

[22] PCT Filed: Jul. 16, 1992

[86] PCT No.: PCT/GB92/01300

§ 371 Date: Jan. 26, 1994

§ 102(e) Date: Jan. 26, 1994

[87] PCT Pub. No.: WO93/02957

PCT Pub. Date: Feb. 18, 1993

[30] Foreign Application Priority Data

Jul. 27, 1991 [GB] United Kingdom .................. 9116246

[51] Int. Cl.[6] ........................................................ H02P 7/00
[52] U.S. Cl. .................... 318/432; 318/6; 242/250; 242/390; 242/225
[58] Field of Search .......................... 318/6, 561, 432, 318/560; 242/193, 250, 225, 186, 75.44, 86.51, 390, 225

[56] References Cited

U.S. PATENT DOCUMENTS

| | | | |
|---|---|---|---|
| 3,863,741 | 2/1975 | Mitsuishi et al. | 318/6 |
| 3,982,160 | 9/1976 | Goldschmidt et al. | 318/6 |
| 3,990,551 | 11/1976 | Jamison et al. | 242/403 |
| 4,248,382 | 2/1981 | Moore | 242/403 |
| 4,454,999 | 6/1984 | Woodruff | 242/86.51 |
| 4,531,166 | 7/1985 | Anderson | 318/6 |
| 4,537,364 | 8/1985 | Pollman et al. | 242/86.51 |
| 4,700,023 | 10/1987 | Hillmann et al. | 242/86.51 |
| 4,786,992 | 11/1988 | Tajima et al. | 318/6 |
| 5,306,993 | 4/1994 | deFries et al. | 318/560 |
| 5,325,028 | 6/1994 | Davis | 318/560 |
| 5,385,314 | 1/1995 | Hughes | 242/403 |

FOREIGN PATENT DOCUMENTS

| | | |
|---|---|---|
| 0275571A1 | 7/1988 | European Pat. Off. . |
| 3921679C2 | 1/1991 | Germany . |

Primary Examiner—William M. Shoop, Jr.
Assistant Examiner—Karen Masih
Attorney, Agent, or Firm—Austin R. Miller

[57] ABSTRACT

A cable reel system for use in conjunction with a mobile installation movable relative to a fixed base station and being connected to the fixed base station via a cable, the system comprising a reel on which the cable is stored, the reel being connected by a motor shaft to an AC motor which drives the reel via reduction means to pay-out cable whilst the mobile installation moves away from the base station and to reel-in cable whilst the mobile installation moves towards the base station, the reel system further comprising sensing means located adjacent said motor shaft and operable to provide a signal representative of the position of the motor shaft, and a controller, which receives the signal and calculates a torque demand signal, the controller further continually varying a stator current of the motor in response to cable paying-out or reeling-in operating conditions pertaining at a given instant by using the torque demand signal to calculate and supply phase currents to the motor to provide a required torque at the motor shaft for maintaining tension of the cable extending between the mobile installation and the fixed base station within a predetermined range of values.

12 Claims, 2 Drawing Sheets

CABLE REELING SYSTEM

FIELD OF THE INVENTION

This invention relates to a cable reeling system particulary for a mobile installation suitable for use in reeling-in and paying-out cables, for example power cables, which should not be subjected to a high tensioning force. A typical mobile installation might be, for example a crane on a dockside.

Hereinafter, the term 'reel' should be construed widely to include drum/spool-shaped reels as well as for example a mono-spiral reel.

The ideal mobile cable reeling system should reel-in and pay-out the cable under the minimum tension necessary to lift and safely wind the cable on to the reel, without generating slack when the installation stops. Furthermore, the reel should be able to respond effectively to changes in installation velocity and acceleration/decceleration.

DESCRIPTION OF THE PRIOR ART

For static installations, it is known to measure the tension in a cable for example by use of dancer rollers in the paper and strip-winding industries, but these usually take place in clean controlled conditions and are inadequate, for example, for measuring the tension of a 50+mm diameter cable on a dockside subject to sub-zero temperatures.

Accordingly, it is common to employ in a mobile cable reeling applications a form of constant torque device which is capable of delivering a set torque to the reel regardless of the required forward or reverse speeds. Various types of drive have been used and proposed for example torque motors, permanent magnet hysteresis couplings, electromagnet hysteresis couplings, dry friction clutches and wet friction clutches. These systems are usually high speed/low torque in nature and, therefore, require a gearbox to produce a high torque/low speed output. It is usually necessary to use a high efficiency gearbox such as a helical bevel gear box so as to minimise the reverse driving losses associated with the lower efficiency gear boxes and consequentially avoid the torque experienced by the reel on pay-out being higher than on recovery.

Accordingly, it is an object of the present invention to provide a reeling system for use in conjunction with a mobile installation which is able to apply a constant torque to the reel, independently of system losses, such as, for example, backwinding losses in a low performance gear box like a worm drive gear box.

SUMMARY OF THE INVENTION

The present invention provides a reel system for use in conjunction with a mobile installation comprising an AC motor which drives a reel via reduction means, the reel system further comprising sensing means operable to provide a signal representative of the position of the motor shaft, and a controller, which receives said signal, and is operable to vary continually the stator current of the motor in response to the operating conditions pertaining at a given instant to provide a required torque at the motor shaft.

Reduction means is preferably in the form of a gear box.

Sensing means may be in the form of a positional encoder.

The signal is compared with a reference signal to calculate a torque demand signal, which is used to calculate said stator current.

Preferably controller provides the stator current of the motor such that the required torque at the motor shaft is constant.

The reel may be mounted on the mobile installation and connected to the base station via a cable mounted on the reel.

Alternatively, the reel may be mounted on the base station and connected to the mobile installation via a cable mounted on the reel.

The controller may select a system correction factor in response to the direction of movement of the reel.

The required torque may be varied as a function of the amount of cable on the reel.

It is an advantage of the present invention, that it is possible to use lighter cable than was possible even using a high efficiency gear box, like a helical bevel gear box, because of the improved tension control.

BRIEF DESCRIPTION OF THE DRAWINGS

Exemplary embodiments of the invention will now be described with reference to the accompanying drawings, in which.

DETAILED DESCRIPTION OF THE INVENTION

Figure 1:
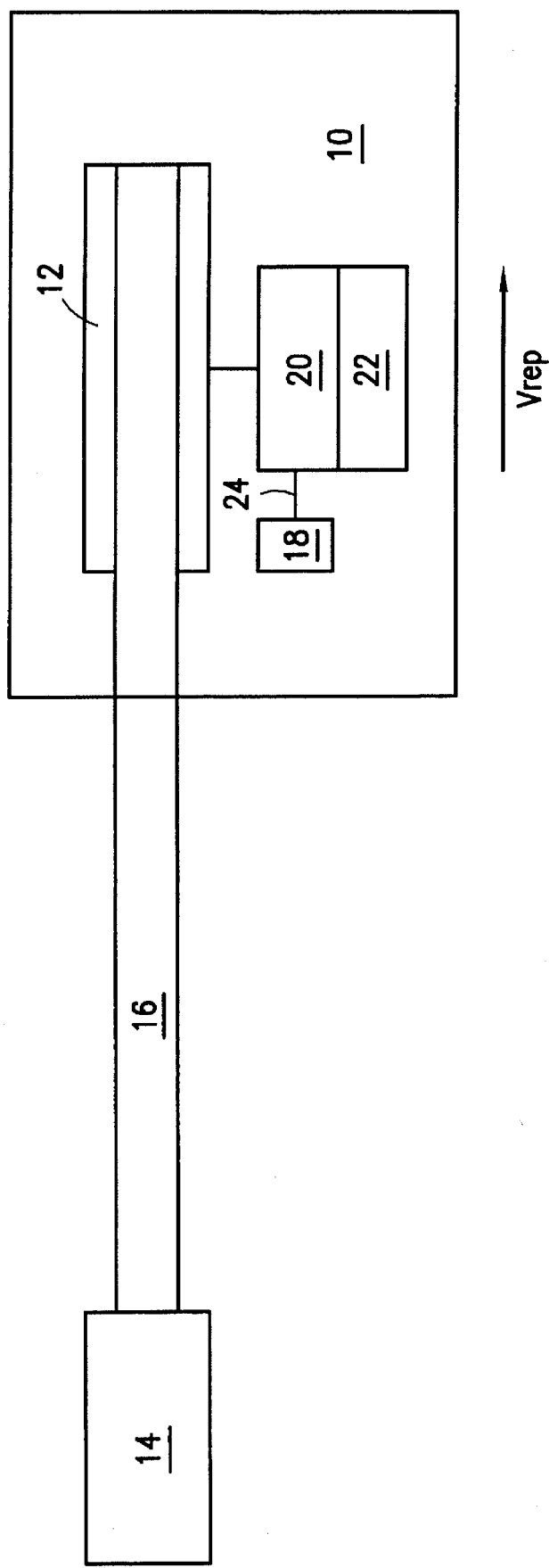
FIG. 1 shows a schematic of the overall hardware lay-out of the system, when the crane is paying-out.
Figure 2:
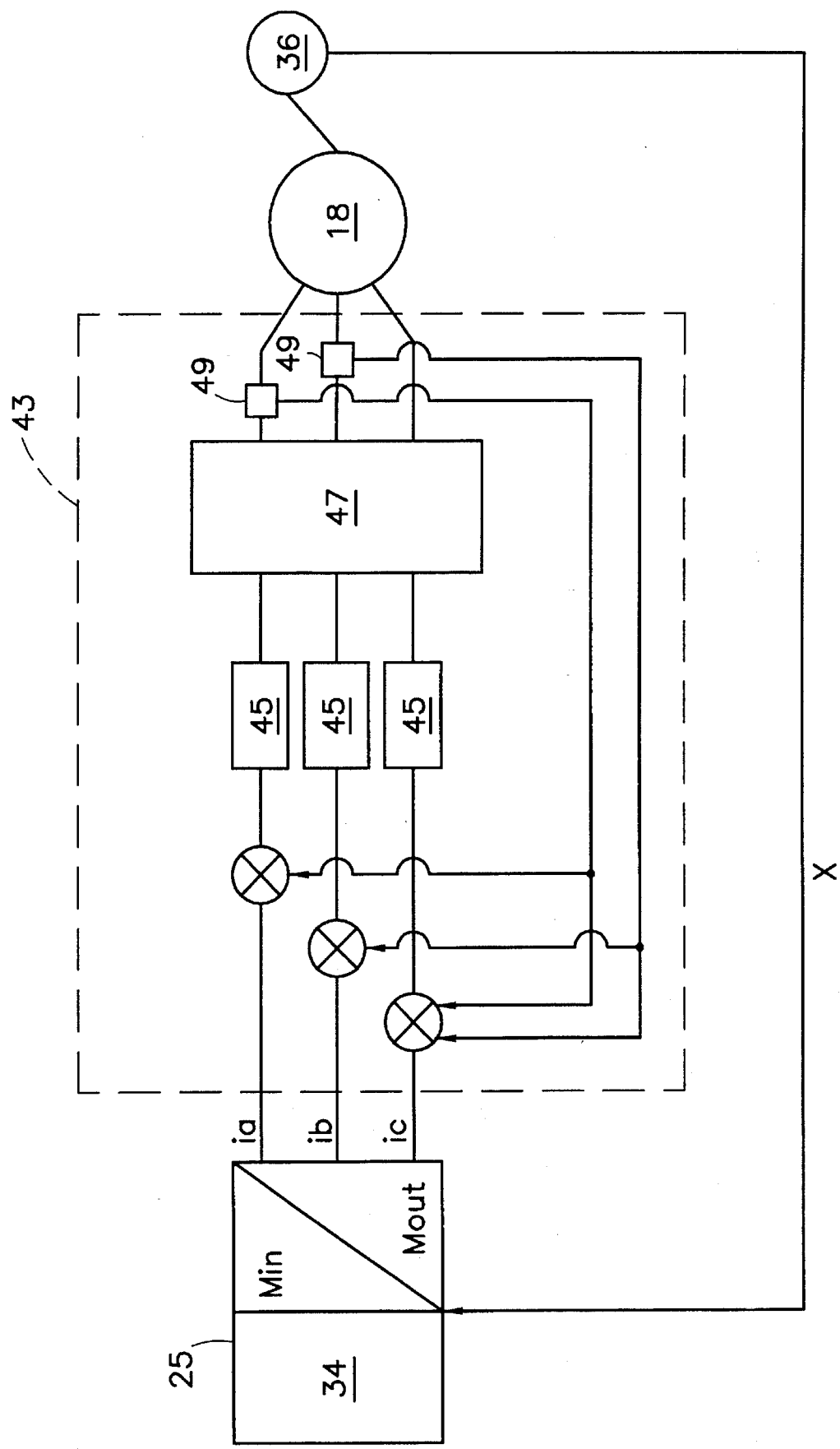
FIG. 2 shows a possible control scheme for the system.

FIG. 1 shows a mobile installation, in the form of a mobile crane 10, provided with power from a base station in the form of a fixed power supply 14 via a power cable 16. The cable 16 is mounted on the crane 10 via a reel 12. The reel 12 is connected to the drive or motor shaft 24 of a standard squirrel cage AC induction motor 18 through a standard worm drive gear box 20. The motor 18 has an incremental shaft encoder 36 (as shown in FIG. 2) mounted on the motor shaft 24. The slip rings are denoted 22.

The motor is further provided with an independent fan (not shown). This is necessary because at low and zero speed operation the motor's built-in fan is not sufficient. The motor is further provided with a fail-safe parking brake (not shown) for end of shift shutdown.

FIG. 2 shows a control arrangement for carrying out torque control of the the motor 18. The encoder 36 provides a motor position signal X, which is sampled by a controller 25 at the rate of, for example, 2 kHz. The signal X is compared With a reference signal, which may be the previously sampled position signal, and a torque demand signal Td calculated. The controller 25 might be in form of, for example, a 16-bit Intel microprocessor. Using the sampled signal Td, the controller software calculates appropriate motor phase current Ia,Ib and Ic using a mathematical model of the motor 18. (In practice, it is only necessary to calculate two of the three motor phases, the third being calculable from the first two. See the description of the output stage 43). The real-time evaluation of the model is facilitated by a set of look-up tables which may be calculated on initiation of the system and stored in the motor map 34. The controller software also uses the signal X to select the appropriate system correction factor Min and Mout depending on whether the reel is reeling-in paying-out. The need for the system correction factor arises partly from the use of gear boxes, particularly low efficiency gear boxes, which have direction dependent running characteristics (backwinding lossses) and also other losses downstream from the motor 18. A conventional output stage 43 is used to drive the motor 18. The output stage 43 comprises three current loops 45 co-operating in a known manner with a power output device 47. As shown in FIG. 2, two phase inputs to the motor 18 may have current transducers 49 attached thereto such that the third phase current may be generated in a manner known in the art.

In use as shown in FIG. 1, the crane 10 is moving with a velocity Vref, and therefore to avoid the cable 16 tensioning to an unacceptable level, the reel 12 must pay out cable at an appropriate rate which matches the velocity of the crane 10. The controller 25 is used to calculate appropriate phase currents, in a manner hereinbefore outlined. The appropriate phase currents are then modified by the appropriate system correction factor, in this case Mout, so that a constant torque may be applied to the reel 12 such that the cable 16 is dragged from the reel 12 under a tension within an acceptable range of values. As a result of the rate at which the motor parameters are updated, the response of the system to changes in velocity is effectively instantaneous.

When the direction of the crane reverses, the controller 25 selects the other correction factor Min, and the cable 16 is pulled on to the reel 12 under a tension within an acceptable range.

In many applications, as was the case in the above-described embodiment, applying a constant torque to the reel is sufficient to ensure that the tension within the cable 16 remains within an acceptable range of values. However, in some applications, for example, when using very large reels, it might be necessary to vary the torque applied to the reel 12 as function of the amount of cable 16 remaining thereon, in order to maintain the tension applied to the cable 16 within acceptable limits. Accordingly, it is possible to program the controller to vary the torque applied to the reel 12 as a function of the amount of cable remaining on the reel 12.

In another embodiment of the invention, the controller 25 may be provided with an auxiliary control unit, in the form of a dedicated auxiliary microprocessor, or, a PC or a personal organizer linked through an interface, and by which means rapid on site fine tuning can be effected and/or by which more sophisticated control algorithms can be developed.

I claim:

1. A cable reel system for use in conjunction with a mobile installation relative to a fixed base station and being connected to the fixed base station via a cable, the system comprising a reel on which the cable is stored, the reel being connected by a motor shaft to an AC motor which drives the reel via reduction means to pay-out cable whilst the mobile installation moves away from the base station and to reel-in cable whilst the mobile installation moves towards the base station, the reel system further comprising sensing means located adjacent said motor shaft and operable to provide a signal representative of the position of the motor shaft, and a controller, which receives said signal and calculates a torque demand signal, the controller further continually varying a stator current of the motor in response to cable paying-out or reeling-in operating conditions pertaining at a given instant by using said torque demand signal to calculate and supply phase currents to the motor to provide a required torque at the motor shaft for maintaining tension of the cable extending between the mobile installation and said fixed base station within a predetermined range of values.

2. A reel system as in claim 1, wherein said signal is compared with a reference signal by the controller to calculate the torque demand signal.

3. A reel system as in claim 1 or 2, wherein the controller provides the stator current of the motor such that said required torque at the motor shaft is constant.

4. A reel system as in claim 1 or 2, wherein the reel is mounted on a mobile installation and is connected to a base station via a cable mounted on the reel.

5. A reel system as in claim 1 or 2, wherein the reel is mounted on a base _station and connected to a mobile installation via a cable mounted on the reel.

6. A reel system as in claim 4, wherein the controller selects a system correction factor in response to the direction of movement of the reel.

7. A reel system as in claim 4, wherein said required torque is varied as a function of the amount of cable on the reel.

8. A reel system as in claim 3 wherein the reel is mounted on the mobile installation.

9. A reel system as in claim 3 wherein the reel is mounted on the base station.

10. A reel system as in claim 5 wherein the controller selects a system correction factor in response to the direction of movement of the reel.

11. A reel system as defined in claim 5 wherein said required torque is varied as a function of the amount of cable on the reel.

12. A reel system as defined in claim 6 wherein said required torque is varied as a function of the amount of cable on the reel.

* * * * *